L. STIERINGER.
COMBINED GAS AND ELECTRIC LIGHT FIXTURE.
No. 11,544. Reissued May 26, 1896.
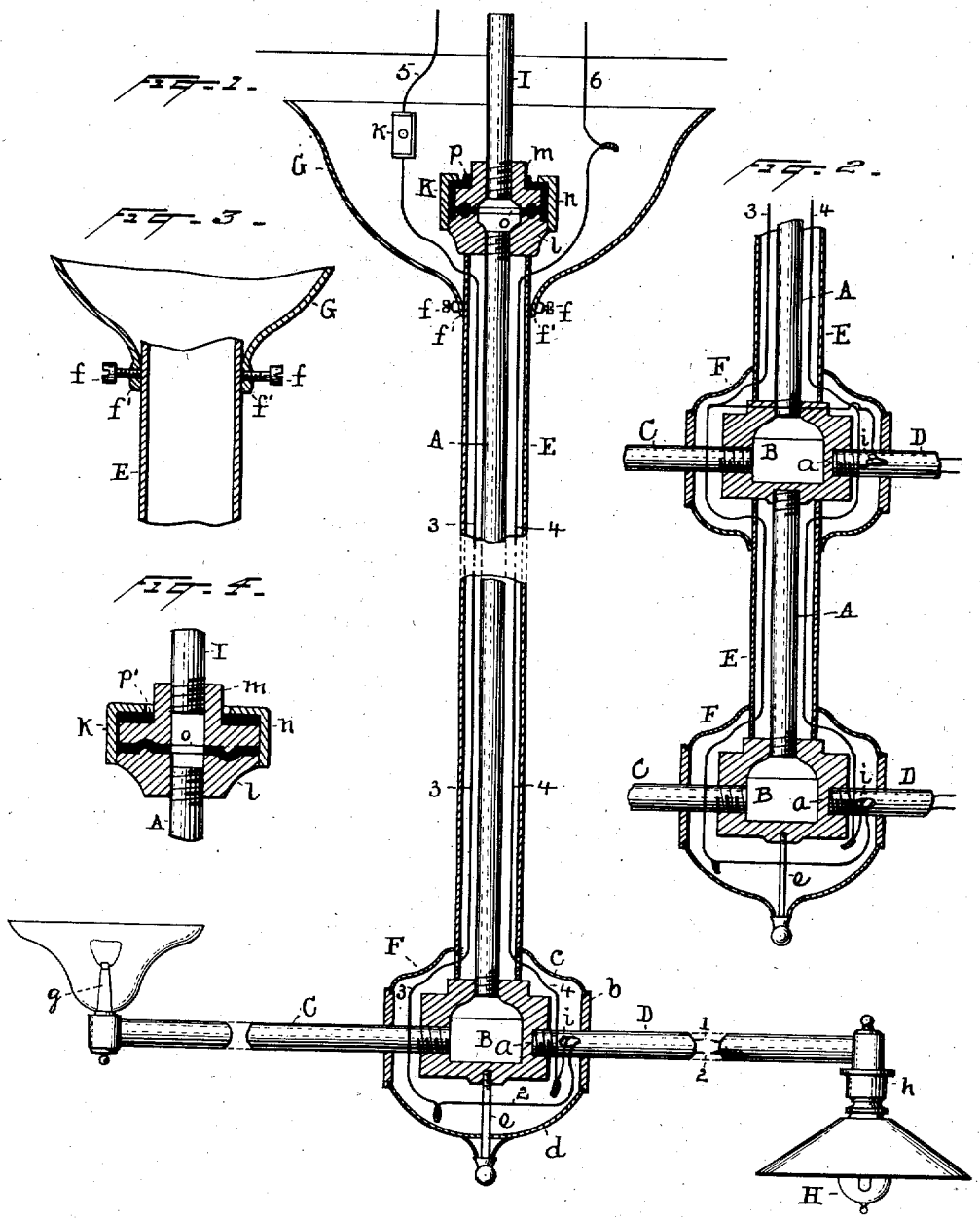
Witnesses
Morris A. Clark.
John R. Taylor.
Inventor
Luther Stieringer.
By his Attorneys
Dyer & Seely.

UNITED STATES PATENT OFFICE.

LUTHER STIERINGER, OF NEW YORK, N. Y., ASSIGNOR, BY DIRECT AND MESNE ASSIGNMENTS, TO GEORGE MAITLAND, OF DETROIT, MICHIGAN.

COMBINED GAS AND ELECTRIC-LIGHT FIXTURE.

SPECIFICATION forming part of Reissued Letters Patent No. 11,544, dated May 26, 1896.

Original No. 294,697, dated March 4, 1894. Application filed December 21, 1894. Serial No. 532,579.

*To all whom it may concern:*

Be it known that I, LUTHER STIERINGER, of the city, county, and State of New York, have invented a certain new and useful Improvement in a Combined Gas and Electric-Light Fixture, of which the following is a specification.

The object I have in view is to produce a combined gas and electric-light fixture constructed wholly or largely of metal and provided with insulated conducting-wires for conveying the electric current to and from the electric lamp or lamps supported thereby, which fixture will not be subject to the objection of forming a ground connection when one of the conductors makes contact with some metal part of the fixture, and which will be simple, compact, and ornamental in construction, the conductors being all hidden from sight and the fixture presenting the appearance of a complete integral fixture, and which, further, while hiding the conductors and connections, will give ready access to such connections and to the "safety-catch" of the fixture for the purpose of making repairs, testing the conductors or insulation, or removing the safety-catch.

In carrying out my invention the chandelier or bracket is constructed, as usual, with a supporting or sustaining stem or arm formed by a central gas-pipe, which is secured to the pipe projecting from the ceiling or wall, and at its other end screws into a central distributing-body, from which project the arms carrying the gas-burners. These parts support ornamental shellwork, the stem being covered by a sleeve in one or more sections, while the distributing-body is covered by a ring through which the distributing-arms pass and by ornamental shells above and below this ring, the shell above the ring being supported by said ring, while that below it is supported by a rod screwed into the distributing-body and projecting downwardly therefrom. A shell, cap, or canopy is used at the top or inner end of the fixture.

To form my combined gas and electric-light fixture, the arms projecting from the distributing-body are divided between those intended for gas and those intended for electric light. Those for gas are of the usual construction, and receive the gas, as usual, from the distributing-body. The arms for the electric light are closed gas-tight at their inner ends, or the holes in the body into which they screw are not tapped all the way through the body. Hence these arms, while in external appearance they are like the gas-arms, do not connect with the interior of the gas-body. Each of these electric-light arms outside of the gas-body, but within the ornamental inclosing body, ring, or shell, has one or two openings made in it, out through which the two insulated conductors of the arm project into the space between the gas-body and the ornamental body. The main or stem wires of the fixture are passed into the sleeve covering the stem through one or more holes or slots made at the upper or inner end of said sleeve. These main wires are carried down through the sleeve, between the same and the central gas-pipe, and enter the ornamental body.

In the space between the gas and ornamental bodies of the fixture the stem and arm wires are connected together, such connections being soldered and then wound with insulating-tape. These connections are made before the lower part of the ornamental body is secured in position and are inclosed within and completely hidden by such ornamental body. The gas-arms are provided with gas-burners, as usual, while the electric-light arms have sockets for incandescing electric lamps, the wires within such arms terminating in the sockets without being exposed to view. The incandescing electric lamps are secured in such sockets and may be arranged in an upright or in a reversed position. The gas and electric-light arms project from the same supporting-body and in the same horizontal plane. Two or more of such supporting-bodies may be used in the same fixture, as is usual in gas-fixtures, and each body may have gas and electric-light arms projecting therefrom, or one or more of such supporting-bodies may have gas-arms alone and one or more have electric-light arms alone, the construction otherwise not differing, essentially, from that before described. At the upper or inner end of the fixture the main or stem wires are secured to the ceiling or wall wires. These latter wires are carried through the ceiling or wall near to the gas-pipe, or are led to the proper points upon the surface of such ceiling or wall. One ceiling or wall wire is connected with one of the main chandelier-wires through an inclosed safety-catch, the preferred construction of which is covered by an application for patent already filed by me. The connection of the other ceiling or wall wire and chandelier-wire is made by soldering the wires together and wrapping the joint thus made. These connections, including the safety-catch and the joint at the upper or inner end of the fixture, are hidden by a shell, cap, or canopy, which is open on its side next to the ceiling or wall. This shell, cap, or canopy is made adjustable to give ready access to the parts, it being secured to the sleeve covering the stem by one or more set-screws, by which it can be adjusted upon such sleeve. In this way, it will be seen, the adjustable canopy is secured to the fixture itself and not to the ceiling or wall, and it can be located on such fixture at its upper or inner end at any distance from the ceiling or wall which the design of the fixture may require to secure the best artistic effect. The canopy can also be made of any suitable shape, size, or design without changing the devices for securing it adjustably upon the fixture, the canopy at its small end being provided with a flange or collar which fits the fixture and need only be made of certain definite sizes. The set-screws for holding the canopy pass through this flange or collar. This matter is not, however, herein claimed, except as applied to a combined fixture, the same being broadly covered by my Patent No. 259,235.

To prevent the accidental formation of a ground connection in the fixture, the gas-joint at the juncture of the fixture-stem and the ceiling or wall pipe is an electrical insulating-joint. This joint is in the form of a "gas-union," with a ring of insulating material between the meeting faces of the union and an insulating ring or cap under the flanged turning cap of the union. Hard rubber may be used for insulation, or any other material not injuriously affected by the gas.

To prevent the fixture from turning at the insulating-joint, the ring between the meeting faces of the union is provided with ribs or projections entering depressions in the parts of the union. This joint permits the gas to pass freely into the stem of the fixture, prevents leakage, insulates the entire fixture electrically from the ceiling or wall pipe, preventing the formation of a ground, allows the fixture to be secured in position without turning it, and prevents the fixture from turning in use, which would cut the wires or abrade the insulating-covering of the same.

The insulating-joint may be placed beyond the fixture in the line of the ceiling or wall pipe; but an insulating-joint is required for each fixture, since the gas-pipe may be in contact with water or other pipes, or have other ground connections at various points in the house, and hence the insulating-joint should be at or near the fixture to assure its effectiveness.

The foregoing will be better understood by reference to the accompanying drawings, in which—

Figure 1 is a vertical section of a chandelier embodying the invention; Fig. 2, a vertical section of a portion of a chandelier having two distributing-bodies; Fig. 3, a sectional view illustrating the adjustable shell, cap, or canopy; and Fig. 4, a sectional view of a slightly-modified form of the insulating-joint.

Like letters and numerals denote corresponding parts in all the figures.

A is the gas-pipe, forming the central supporting stem or arm of the fixture.

B is the central distributing-body, having gas-arms C and electric-light arms D projecting therefrom, the latter arms not passing into the interior of the body B, as shown at *a*.

E is the ornamental sleeve covering the stem A, and F is the ornamental shell-body covering B. This ornamental shell-body may be composed of a ring *b*, through which the arms C D pass, a shell *c*, resting upon such ring and completing the upper side of the shell-body, and a shell *d*, closing the lower side of the ornamental shell-body and supported by a rod *e*, pendent from the distributing-body B.

Instead of having one distributing-body B and covering ornamentation, the fixtures may be provided with two or more of such bodies placed one above the other. The use of two of such bodies is illustrated in Fig. 2.

G is the canopy, which is secured by one or more set-screws *f* to the ornamental sleeve E, and is adjustable vertically thereon. These screws pass through a flange or collar *f'* upon the small end of the canopy. This flange or collar has to be made of certain definite sizes to fit the several sizes of fixture-stems or ornamental sleeves; but the canopy itself can be made of any shape, size, or design, and can be located at the inner or upper end of the fixture, at any distance from the ceiling or wall which may be required by the design of the fixture. Each gas-arm has any suitable gas-burner *g* mounted thereon.

H is the incandescing electric lamp, secured in a socket *h*, attached to the end of each arm D. This electric lamp may be in a reversed or upright position. The insulated arm-wires 1 2 terminate in this socket, and are hidden from sight within the arm. They pass out of the arm into the space between the distributing-body and the ornamental shell-body through one or more openings *i* in the arm. The main chandelier-wires 3 4 pass from the canopy G, through one or more holes or slots, into the interior of the sleeve E and down through such sleeve to the lower end of the same, and then out of the sleeve into the ornamental shell-body F, where they are secured to the arm-wires, as shown. The ceiling or wall wires 5 6 are secured to the main chandelier-wires 3 4 within the canopy G, one connection being through the inclosed safety-catch *k*.

I is the ceiling or wall gas-pipe, which is secured to the pipe A of the fixture by the insulating-joint K. This joint is a gas-union composed of a screw-collar *l*, secured to A, a plain collar *m*, of smaller size than *l*, secured to I, and a flanged cap *n*, screwing onto *l* and drawing *m* by its flange. A ring *o*, of hard rubber or other proper insulating material, is placed between the opposing faces of *l* and *m*, while an insulating-cap *p* is placed under *n* and between it and *m*.

The cap *p* may be replaced by a simple ring *p'*, Fig. 4, placed under the flange of *n* and projecting beyond the edge of *m*, while the ring *o* may also project beyond *m*, the two rings effecting a complete insulation of the parts of the joint.

To prevent the turning of the fixture at this joint and the cutting of the wires, the insulating-ring *o* has projecting points or ribs entering corresponding depressions in the faces of *l* and *m*, as shown.

What I claim is—

1. In a combined gas and electric-light fixture, having a supporting or sustaining stem or arm formed by a central gas-pipe, a distributing-body and ornamental covering for said gas-pipe and body, the combination of one or more gas-arms projecting from said distributing-body, and one or more separate arms for carrying electric lamps supported by the fixture, each of said latter arms opening into the space beneath the ornamental covering, main insulated conducting-wires located between the central gas-pipe and the ornamental covering, and insulated conducting-wires passing through each of said electric-lamp arms and connected directly with the main wires within the ornamental covering of the fixture, whereby the combination-fixture presents the appearance of a single structure of integral design and the wiring is wholly concealed, substantially as set forth.

2. In a combined gas and electric-light fixture, the combination, with a central supporting gas-pipe stem or arm and one or more gas-distributing bodies, of separate arms for gas-burners and electric lamps, supported by such distributing body or bodies, the arms for electric lamps being closed against the admission of gas thereto, substantially as set forth.

3. In a combined gas and electric-light fixture, the combination, with a central supporting gas-pipe stem or arm and one or more gas-distributing bodies, of separate arms for gas-burners and electric lamps, supported by such distributing body or bodies, the arms for electric lamps being closed against the admission of gas thereto, and conductors entering or running out of the electric-lamp arms through side openings in such arms outside of such body or bodies, substantially as set forth.

4. In a combined gas and electric-light fixture, the combination, with a central supporting gas-pipe stem or arm and one or more gas-distributing bodies, of separate arms for gas-burners and electric lamps, supported by such distributing body or bodies, the arms for electric lamps being closed against the admission of gas thereto, side openings in such electric-lamp arms outside of the gas-distributing body or bodies, but within the ornamental covering of such body or bodies, conductors inclosed within said electric-lamp arms and passing outwardly through such side openings, and main or stem conductors connected with such arm-conductors and concealed within the ornamental covering of the fixture, substantially as set forth.

5. In a combined gas and electric-light fixture made as a single structure of integral design, the combination with a central pipe for supplying gas surrounded by an ornamental covering-sleeve, of an insulating-joint, introduced in said pipe above the ornamental covering-sleeve, and comprising metallic coupling portions, an intermediate section of insulating material electrically insulating the metallic coupling portions from each other and a central gasway therethrough, insulated main conducting-wires for conveying current to and from the electric lamps carried by the fixture located in the space between the gas-pipe and its covering-sleeve and entering said space at the upper or inner end of said covering-sleeve and below said insulating-joint, and a canopy or shell adjustably secured upon the upper or inner end of said covering-sleeve and below the point of entrance of the conducting-wires into the space covered by said sleeve, substantially as set forth.

6. In a combined gas and electric-light fixture made as a single structure of integral design, the combination with a central pipe for supplying the gas, a gas-distributing body having gas-arms, and an ornamental covering surrounding said central gas-pipe and said distributing-body, of an insulating-joint attached to the upper or inner end of said gas-pipe and having a gasway therethrough, one or more separate arms for the electric lamps supported by the fixture and opening into the space beneath the ornamental covering of the fixture, main insulated conducting-wires entering said space at the upper or inner end of the fixture and below said insulating-joint and arm-wires passing through each of said electric-lamp arms and directly connected to the main wires within said space, the wiring being wholly concealed, substantially as set forth.

7. The insulating-joint constructed in the form of a gas-union and having insulating-washers, the opposing parts of such union being locked against turning upon each other, substantially as and for the purpose set forth.

This specification signed and witnessed the 14th day of December, 1894.

LUTHER STIERINGER.

Witnesses:

EUGENE CONRAN,

W. PELZER.